(12) United States Patent
Klos et al.

(10) Patent No.: US 9,912,661 B2
(45) Date of Patent: Mar. 6, 2018

(54) IDENTIFICATION OF PROXIMATE DEVICES

(75) Inventors: Victor Bastiaan Klos, The Hague (NL); Mattijs Oskar van Deventer, Leidschendam (NL); Jeroen Laarakkers, Nootdorp (NL)

(73) Assignee: NEDERLANDSE ORGANISATIE VOOR TOEGEPAST-NATUUR-WETENSCHAPPELIJK ONDERZOEK TNO, 's-Gravenhage (NL)

( * ) Notice: Subject to any disclaimer, the term of this patent is extended or adjusted under 35 U.S.C. 154(b) by 768 days.

(21) Appl. No.: 13/502,195

(22) PCT Filed: Oct. 15, 2010

(86) PCT No.: PCT/NL2010/050685
§ 371 (c)(1),
(2), (4) Date: Jun. 19, 2012

(87) PCT Pub. No.: WO2011/046442
PCT Pub. Date: Apr. 21, 2011

(65) Prior Publication Data
US 2012/0244810 A1   Sep. 27, 2012

(30) Foreign Application Priority Data

Oct. 16, 2009 (EP) .................................. 09173348

(51) Int. Cl.
*H04B 7/00* (2006.01)
*H04L 29/06* (2006.01)
(Continued)

(52) U.S. Cl.
CPC ...... *H04L 63/0869* (2013.01); *H04L 63/0492* (2013.01); *H04W 12/06* (2013.01); *H04M 1/7253* (2013.01)

(58) Field of Classification Search
CPC ............ H04L 63/0492; H04L 63/0869; H04M 1/7253; H04W 12/06
(Continued)

(56) References Cited

U.S. PATENT DOCUMENTS

2006/0087999 A1* 4/2006 Gustave et al. .............. 370/328
2006/0234631 A1* 10/2006 Dieguez .............. H04W 76/023
455/41.2

(Continued)

FOREIGN PATENT DOCUMENTS

EP         2018032      1/2009
WO         2009014438   7/2009

*Primary Examiner* — Xin Jia
(74) *Attorney, Agent, or Firm* — Lucas & Mercanti, LLP (57) ABSTRACT

A method of identifying proximate client devices (1, 2) comprises the steps of:
  providing a sensory identifier,
  the first device (1) detecting the sensory identifier and sending a first request message (RQ1) comprising a first representation of the sensory identifier to a matching unit which is preferably part of a correlation server (5),
  the second device (2) detecting the sensory identifier and sending a second request message (RQ2) comprising a second representation of the sensory identifier to the matching unit, and
  the matching unit comparing the first representation and the second representation and sending an acknowledgement message (AC1, AC2) to each of the first device (1) and the second device (2) if a match is made.

Each request message (RQ1, RQ2) contains a pointer to at least one property of the respective device (1, 2). In addition, the matching unit applies matching rules relating to the properties to limit the number of possible matches.

5 Claims, 3 Drawing Sheets

(51) Int. Cl.
*H04W 12/06* (2009.01)
*H04M 1/725* (2006.01)
(58) Field of Classification Search
USPC .......................................................... 455/41.2
See application file for complete search history.

(56) References Cited

U.S. PATENT DOCUMENTS

| | | |
|---|---|---|
| 2007/0174243 A1* | 7/2007 | Fritz ................................. 707/3 |
| 2008/0132202 A1* | 6/2008 | Kirkup ................ H04L 63/0227 |
| | | 455/410 |
| 2009/0117883 A1* | 5/2009 | Coffing et al. .............. 455/414.1 |
| 2009/0171990 A1* | 7/2009 | Naef, III ........................ 707/100 |
| 2010/0210287 A1* | 8/2010 | De Vries et al. .......... 455/456.3 |

\* cited by examiner

IDENTIFICATION OF PROXIMATE DEVICES

CROSS-REFERENCE TO RELATED APPLICATIONS

This application is a 371 of PCT/NL2010/050685, filed Oct. 15, 2010, which claims the benefit of European Patent Application No. 09173348.5, filed Oct. 16, 2009, the contents of each of which are incorporated herein by reference.

FIELD OF THE INVENTION

The present invention relates to the identification of proximate devices. More in particular, the present invention relates to a method of and a system for matching and/or identifying proximate devices, which method preferably involves the detection of a sensory identifier by two or more devices and the exchange of messages between the devices to achieve mutual identification.

BACKGROUND OF THE INVENTION

European Patent Application EP 2 018 032 & International Patent Application WO 2009/014438 (TNO/KPN) disclose a method of identifying proximate mobile devices. This known method comprises the steps of providing a sensory identifier capable of being detected by the human senses, at least two mobile devices detecting the sensory identifier, one of the mobile devices sending a message to another mobile device, and the other mobile device sending an acknowledgement so as to establish mutual identification. The sensory identifier may be a visual identifier, such as a bar code, or an audio identifier, such as a sound signal. The method of WO 2009/014438 may involve a server for carrying out (part of) the identification process, and/or for carrying out the optional step of verifying a sensory identifier so as to reduce the probability of erroneous identifications.

Erroneous identifications may occur, for example, if several devices detect similar sensory identifiers. A certain sound signal, such as the sound produced by tapping two (mobile) devices together, may be detected by devices that are not involved in the tapping. Erroneous identifications may also occur when two or more similar sensory identifiers are produced almost simultaneously in the proximity of the devices, for instance by tapping together several pairs of (mobile) devices in the same room at approximately the same instant.

SUMMARY OF THE INVENTION

It is an object of the present invention to overcome these and other problems of the Prior Art and to provide a method of and a system for matching and/or identifying proximate devices which produce a reduced number of erroneous identifications.

It is a further object of the present invention to provide a method of and a system for matching and/or identifying proximate devices which are more efficient.

It is a still further object of the present invention to provide a server for identifying proximate devices.

Accordingly, the present invention provides a method of identifying proximate devices, the method comprising the steps of:
providing a sensory identifier capable of being detected by human senses,
the first device detecting the sensory identifier and sending a first request message comprising a first representation of the sensory identifier to a matching unit,
the second device detecting the sensory identifier and sending a second request message comprising a second representation of the sensory identifier to the matching unit,
the matching unit comparing the first representation and the second representation and sending an acknowledgement message to each of the first device and the second device if a match is made,
characterised in that each request message contains a pointer to at least one property of the respective device, and in that the matching unit applies matching rules relating to the properties to limit the number of possible matches.

By providing matching rules which use properties of the devices, such as technical properties, the matching process can be made more efficient and the probability of erroneous matches can be significantly reduced. The matching rules may state, for example, which matches (that is, combinations) of device properties are allowed. It will be understood that a time stamp is not a device property.

If one of the devices is a payment terminal, for example, then the other device is probably not also a payment terminal if a match is to be made (in this example, the property can be "device type"). It will be understood that one of the devices may be mobile while the other (or another) may not be mobile but stationary, that is, may have a fixed location and/or may not be portable. However, it is also possible that both or all devices involved are mobile devices, for example mobile telephone devices.

The rules may also use probabilities: a match between a first device having property A and a second device having property B may be 10 times more likely than a match of the first device having property A and a third device having property C. The matching unit may then produce a match A-B on the basis of these probabilities, even though the similarity between the sensory identifier representations of the first and the third devices is greater. In other words, the similarity of the representations may be weighed with the probabilities of such matches.

It will be understood that the term "identifying", in this context, is meant to include the process of establishing the identity of a (mobile or stationary) device or its user by matching at least one identifier detected by the device with at least one identifier detected by another device, these identifiers preferably being identical or at least similar. The acknowledgement messages which are sent to the devices when a match has been made may contain an identification of the other device(s) to allow the matched (and therefore proximate) devices to identify each other.

It will further be understood that the term "sensory identifier", in this context, is meant to include identifiers which can be detected by the (human) senses, such as sounds (audio identifiers), images (visual identifiers) and smells (olfactory identifiers). In addition to sensory identifiers, other identifiers may be used, such as location identifiers (determined by, for example, GPS or GSM technology).

The pointer to the property which is contained in each request message and which forms an indication of that property may be constituted by the property itself (direct option). That is, each request message may contain a property of the requesting device, such as a device number. However, it is also possible that the pointer to the property is constituted by a certain identification which allows the matching unit to retrieve the respective property (indirect option). In that case, the properties are stored in a suitable memory, either in the matching unit or external to the matching unit, and can be retrieved using the device identifications. In an advantageous embodiment, pairs of device identifications and device properties are stored for a plurality of devices or device classes.

The matching rules used in the present invention may be utilised in various ways. In a first embodiment, a matching rule defines which properties of the devices are required for a match. In this embodiment, a matching rule may state that both or all devices involved in a match should be of type A, or inversely, that matches are only possible between a type B and a type C device. In a second embodiment, a matching rule defines which properties of the devices are likely to produce a match. In this embodiment, a matching rule states probabilities: a match A-B is more likely than a match A-C.

A combination of the above-mentioned first and second embodiments is also possible. In all embodiments, the matching rules may depend on the particular purpose of the match, which purpose may be determined by the application (for example a game, transaction, and/or information exchange) using the match and the resulting identification of the devices. Also, in all embodiments the matching rules complement the representations-based matching process in which the representations of the sensory identifiers are compared and their similarity is determined.

The matching rules may be predetermined. In an advantageous embodiment, however, the matching rules are adjusted during use. The adjustment may be made on the basis of successful matches, and/or on the feedback received from a software application which uses the match results.

The present invention also provides a computer program product for carrying out the method defined above, in particular the steps of matching the representations of the detected sensory identifiers while taking matching rules into account. A computer program product may comprise a set of computer executable instructions stored on a data carrier, such as a CD (Compact Disc) or a DVD (Digital Versatile Disc), so as to constitute a tangible computer program product. The set of computer executable instructions, which allow a programmable computer to carry out the method as defined above, may also be available for downloading from a remote server, for example via the Internet.

The present invention additionally provides a matching unit for matching proximate devices which each detect a sensory identifier capable of being detected by human senses and which each send a respective request message comprising a respective representation of the sensory identifier to the matching unit, the matching unit being arranged for comparing the first representation and the second representation and sending an acknowledgement message to the first device and the second device if a match is made, characterised in that the matching unit is arranged for applying matching rules relating to properties of the respective device to limit the number of possible matches, each request message containing a pointer to at least one property.

The matching unit of the present invention may further be constituted by a server. This server may be a dedicated server or an application server. However, the matching unit may also be part of one of the devices. The present invention still further also provides a system for interactive gaming comprising at least two devices and at least one matching unit as defined above.

BRIEF DESCRIPTION OF THE DRAWINGS

The present invention will further be explained below with reference to exemplary embodiments illustrated in the accompanying drawings, in which.

DETAILED DESCRIPTION OF THE INVENTION

Figure 1:
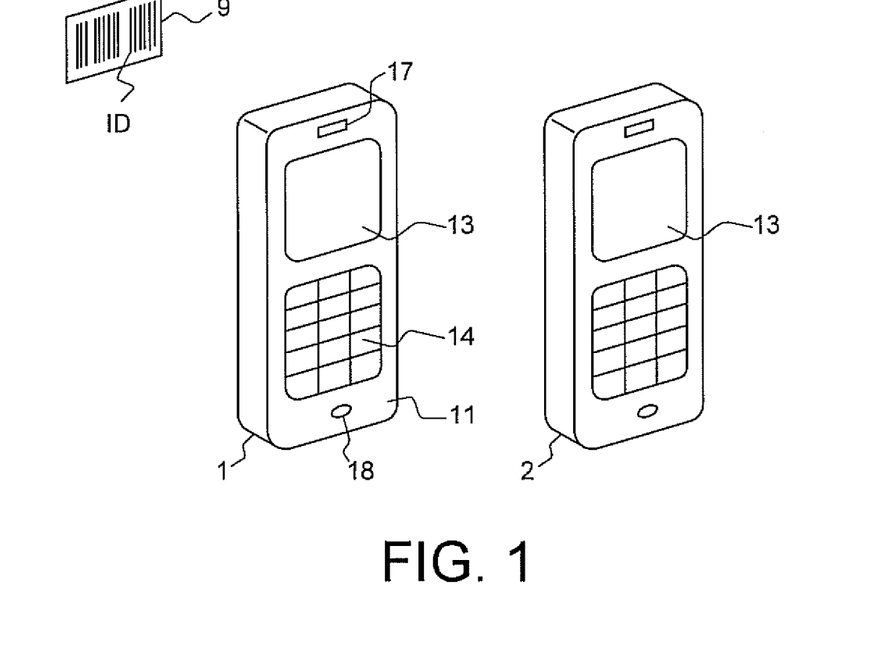
FIG. 1 schematically shows exemplary embodiments of devices and a sensory identifier as used in the present invention.

The set of devices shown merely by way of non-limiting example in FIG. 1 comprises a first device 1 and a second device 2, which may be referred to as client devices. In the example shown, the client devices are mobile (that is, portable) telephone devices arranged for mobile (that is, cellular) telephone services which may, however, also incorporate other functions, such as PDA (Personal Digital Assistant) functions.

Figure 2:
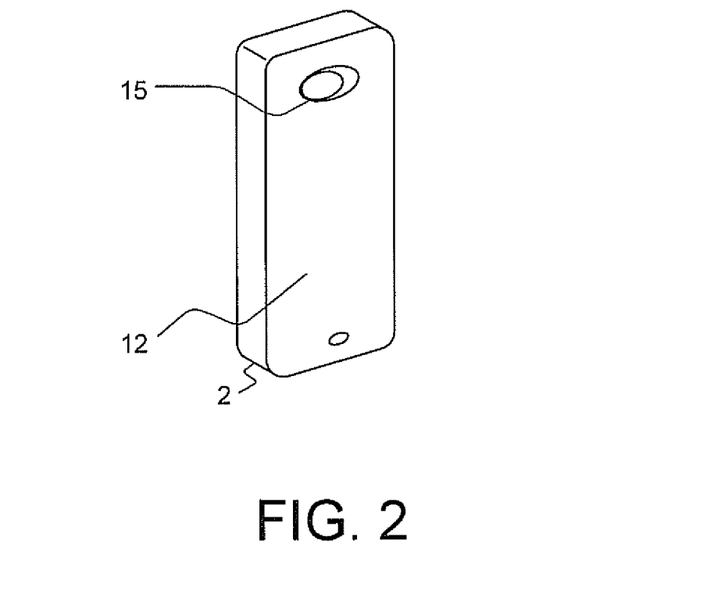
FIG. 2 schematically shows the back of an exemplary embodiment of a device as shown in FIG. 1.

Each mobile device 1, 2 has a front face 11 on which a display screen 13, a keypad 14, a loudspeaker 17 and a microphone 18 are arranged. It will be understood that the loudspeaker and/or the microphone may alternatively be arranged on a side face of the device. As shown in FIG. 2, each mobile device may have a bar code scanner or camera 15 arranged at its rear face 12.

The mobile devices 1, 2 are capable of detecting a sensory identifier. The sensory identifier ID shown in FIG. 1 is constituted by a bar code. This bar code may be "read" by a bar code scanner or a camera of a mobile device, as shown in FIG. 2.

A visual sensory identifier, such as a bar code or a symbol, may be applied on a sticker or label 9. Instead of a stationary spatial pattern, such as the regular bar code shown in FIG. 1, a temporal pattern may be used, such as a blinking pattern or symbol of which the frequency and/or time intervals contain the identifying information. Accordingly, the visual identifier may be constituted by a spatial and/or temporal pattern, for example produced by a display (such as an advertising display in a shop or shop window) or a light.

The sensory identifier may alternatively, or additionally, comprise an audio identifier, such as a sound signal. The audio identifier may be rendered by a loudspeaker of a device, or may be produced by a percussive element external to the device, such as a drum or a tuning fork. Alternatively, or additionally, the audio identifier may be produced by clapping hands or by tapping the (mobile) devices together. The sensory identifier may be accompanied by a time stamp. This allows sensory identifiers from multiple sources to be distinguished.

As stated above, an audio identifier may be produced by tapping the (mobile) devices 1 and 2 together. The tapping sound is received by the microphones 18 of both mobile devices. The audio identifier may alternatively be constituted by a sound signal produced by a loudspeaker (e.g. a loudspeaker 17 of the mobile devices shown in FIG. 1), the sound signal preferably consisting of multiple tones and/or pulses so as to be able to distinguish a plurality of different identifiers and/or time stamps.

Alternatively, or additionally, scent identifiers and/or touch identifiers may be used. The devices may, in such embodiments, be capable of detecting smells which are also detected by another device, or may be capable of sensing the surface of another object or device, the sensed surface containing touch identifiers, for example Braille symbols. Movement detectors for detecting (common) movements of the (mobile) devices may also be used. The present invention is therefore not limited to audio or visual identifiers.

The sensory identifiers, in the example of FIGS. 1 and 2 visual identifiers, serve to identify the devices when they are located in each other's proximity. The method of identifying serves to determine the identity of the other device, which identity may subsequently be used for exchanging information and/or playing games. More in particular, the method of identifying according to the present invention may comprise several steps, including the steps of a first device detecting a sensory identifier (such as a bar code or an audio signal) and sending a request message associated with the sensory identifier to the second device or to a central (that is, common) device. It is further possible to verify the detected identifier by comparing the identifier with a predetermined format, range or similar measure. Pattern recognition techniques may be used to match the detected identifier with a stored identifier format and/or to recognize the detected identifier.

Figure 3:
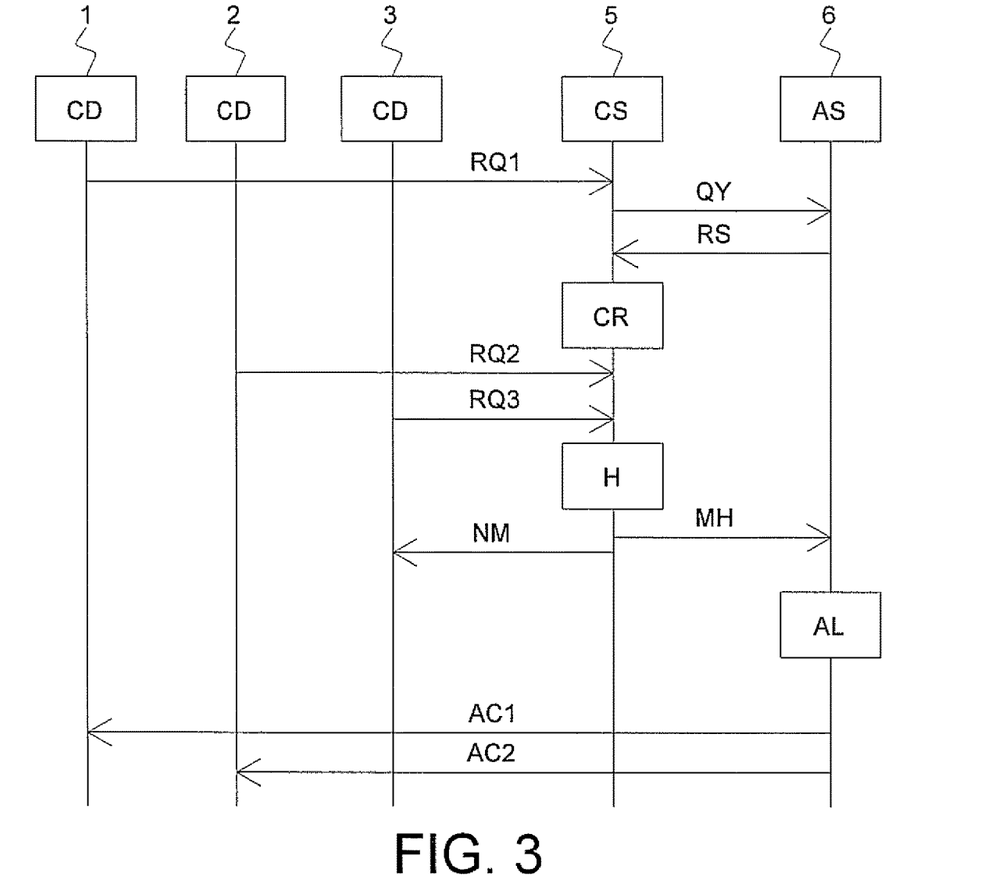
FIG. 3 schematically shows an exemplary embodiment of the exchange of messages between devices, a correlation server and an application server in accordance with the present invention.

An exemplary exchange of information in accordance with the present invention is schematically illustrated in FIG. 3, where three client devices (CD) 1, 2 and 3 interact with a correlation server (CS) 5 and an application server (AS) 6, the correlation server 5 comprising a matching unit.

The client devices 1, 2 and 3 may be mobile consumer devices, such as the mobile telephone devices 1 and 2 depicted in FIGS. 1 and 2. However, at least one of the client devices may be a stationary device, such as a (stationary) payment terminal. The correlation server 5 is a computer device, preferably a server, arranged for matching client devices on the basis of detected (sensory) identifiers and possibly other items. The term "correlation" here refers to establishing the correspondence between two or more (sensory) identifiers or, more in general, two or more client devices, by comparing (sensory) identifiers and optionally other items. The application server 6 is a computer device, preferably a server, which provides a software application for use by the client devices. Exemplary software applications are games, financial transactions, and data exchanges (such as exchanging electronic business cards).

In the example of FIG. 3, a first client device 1 first detects an identifier, such as the visual identifier ID shown in FIG. 1. Upon detecting this identifier, the first client device 1 sends a first request message RQ1 to the correlation server 5. This first request message RQ1 contains an identification of the first client device 1, a representation of the detected identifier (ID in FIG. 1), and—optionally—additional information, such as further information concerning the first client device 1, such as its type (for example "mobile telephone") and/or other properties (for example "game X loaded"). The first request message RQ1 can therefore be represented as:

RQ1={CI1,RE1,PR1, ... } where CI1 is the first client device identification, RE1 is the representation of the identifier (ID in FIG. 1) as represented by the first client device 1, and PR1 is a property of the first client device 1. The representation may be a string of numbers or any other suitable code. In the case of the bar code shown by way of example in FIG. 1, the representation RE1 may be the number represented by the bar code as detected by the first client device. It will be understood that detection errors, which may be caused by movements of the client device or by dirt on the bar code, for example, may result in a representation that differs from the actual content of the identifier. In addition, detection errors or other errors may result in different representations of the same identifier being produced by different client devices. Accordingly, the second representation RE2 produced by the second client device 2 will be similar but not necessarily equal to the first representation RE1.

The first property PR1 is any property suitable for matching client devices and/or for determining applications that can be run using the particular client device. The property PR1 may be a device type (mobile telephone, PDA, BlackBerry®, iPod, laptop computer, etc.), software property, access property, or any other suitable property. It is noted that the term property refers to a technical aspect of the device, and does not refer to a time stamp or similar aspect.

In the example above, the (first) request message RQ1 contains the actual property PR1. In an alternative embodiment, the properties are stored and can be retrieved by the matching unit by using a pointer to the property, such as a reference to the property or the client device identification CI1. In general, the (first) request message will, according to the present invention, always contain a pointer to the property: either the property itself or a reference to the property, such as the client identification. It will be clear that the first request message RQ1 can also be represented by:

RQ1={CI1,RE1, ... } or by:

RQ1={CI1,RE1,IN(PR1), ... } where IN(PR1) is a pointer to property PR1 other than the identification CI1.

Figure 5:
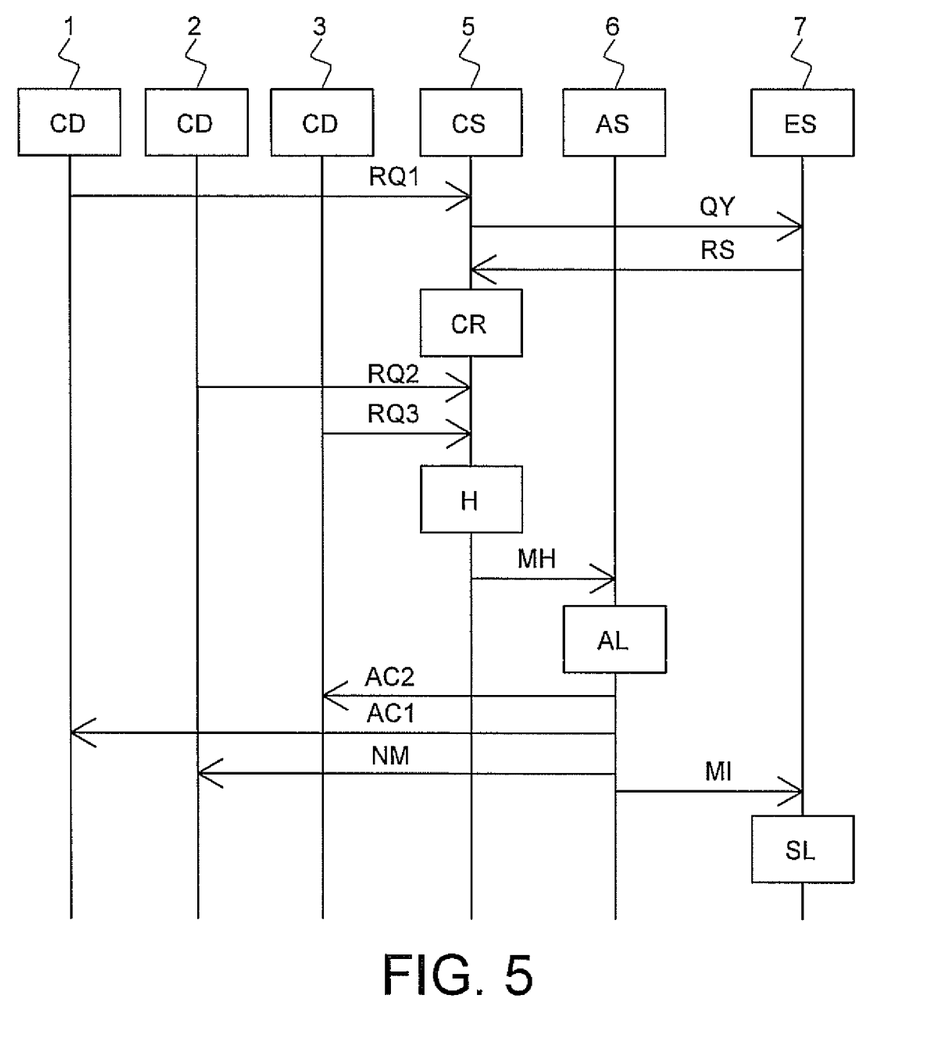
FIG. 5 schematically shows an exemplary embodiment of the exchange of messages between devices, a correlation server and an application server while involving an expert system.

It is noted that the messages shown in FIGS. 3 & 5 are preferably transmitted wirelessly, for example by using optical (e.g. infra-red) or electromagnetic (radio) techniques, which are well known. For example, Bluetooth® could be used for transmitting the messages illustrated in FIG. 3. Alternatively, or additionally, mobile telephone (GSM, UMTS) techniques could be used, such as text messaging (SMS, GPRS). All messages containing information, such as properties PR1, PR2, ... , will typically also contain a header and/or a trailer, so the brackets { } refer only to the payload of the message.

It is further noted that most of what has been discussed above with respect to the first client device 1, the first request message RQ1, the first client device identification CI1, the first representation RE1, and the first property PR1 equally applies to the second and further client devices 2, 3, ... and their respective request messages RQ2, RQ3, ... , identifications CI2, CI3, ... , representations RE2, RE3, ... , and properties PR2, PR3, ... . It will be understood that more than one property can be associated with a single client device. The first client device 1 may have two, three or more properties that are transmitted in the first request message RQ1: the (first) properties $PR1_1$, $PR1_2$, $PR1_3$, ... . For the sake of convenience, this series of properties may be considered as a single, composite property PR1. It will further be understood that the first client device 1 may send more than one request message, where each request message may contain a single property and/or other item.

Upon receipt of the first request message RQ1, the correlation server 5 sends a query message QY to the application server 6. This query message QY contains (a pointer to) at least one property PR1 of the first client device 1 and can therefore be written as:

QY={PR1} or, more in general:

QY={IN(PR1)} where IN(PR1) is a pointer to property PR1, for example the client identification CI1 as in the following embodiment of the query message:

QY={CI1}.

According to the present invention, the application server 6 returns a response message RS which contains one or more rules pertaining to the property PR1 (and any other properties) contained in the query message QY. Accordingly, the response message RS can be written as:

RS={Rule1(PR1),Rule2(PR1), ... }.

A rule (such as Rule1) may, for example, state that when client device 1 has property "A", a match "A-B" is much more likely than a match "A-C". In other words:

Rule1(PR1="A"): probability ("A–B")=90%, probability ("A–C")=10%.

This means that a match with a client device having property "B" is far more likely than a match with a client device having property "C".

The rule or rules contained in the response message RS are subsequently cached in the intermediate step cache response (CR). Then the request messages RQ2 and RQ3, produced by the second client device 2 and the third client device 3 respectively in response to detecting the identifier (ID in FIG. 1), reach the correlation server 3. It is noted that the second and third client devices presumably detected the same (instance of the) identifier, but this has to be verified.

Figure 6:
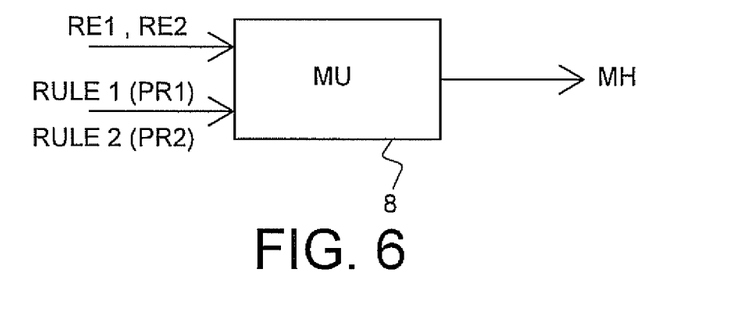
FIG. 6 schematically shows a matching unit according to the present invention.

Having received at least two request messages, the correlation server 5 can start matching the client devices. According to the present invention, this matching involves both the representations of the identifier and any rules, which in the present example are stored in the cache (that is, temporary memory). This is schematically illustrated in FIG. 6, where a matching unit 8 is shown to produce a match MH in response to representations RE1 & RE2 and heuristics (that is, rules) H. The matching unit 8 may be a separate hardware and/or software unit, or may be integral with a server or other device.

In a first step, the correlation server (or its matching unit) compares representations, for example RE1 and RE2 (it is noted that in this example it is assumed that client device 1 is "leading": matches are made with device 1 and either device 2 or device 3 is selected. A match between all three devices, or a match between devices 2 and 3 (excluding device 1) is not possible in this example). If the representations (for example RE1 and RE2) are identical, a (preliminary) match exists. If the representations are not identical, their similarity is determined using a suitable measure, such as a distance measure or a percentage of matching characters.

In a second step, the correlation server (or its matching unit) compares RE1 and RE3. It is noted that in some embodiments, RE1, RE2 and RE3 (and any further representations) may be compared simultaneously, thus combining the first and the second steps. In some embodiments, the match may be expressed as a percentage: the representations match for 90%, which may be the case when 9 out of 10 numbers of a code are identical (for example the representations coded as 1234$\underline{5}$67890 and 1234$\underline{0}$67890). A threshold may be applied to determine the minimum number of matching characters required for a (preliminary) "match", for example 50%.

As a result of the first and second steps, the similarity, or in general a degree of similarity between the representations has been established. For example, the similarity between RE1 and RE2 may be 60%, while the similarity between RE1 and RE3 may be 90%. At first sight, a match should be made between client devices 1 and 3, and not between 1 and 2 (assuming that only a single match can be made). However, in accordance with the present invention not only the similarities between the representations but also the likelihood of certain matches, as expressed by rules (that is, heuristics), is taken into account. That is, the rules state which matches are possible and/or which matches are more likely than other matches.

If a rule states that a match between client device 1 and client device 3 is not allowed (for example because the devices are incompatible), then the higher degree of similarity between the representations of client devices 1 and 3 is ignored and a match will be made between client devices 1 and 2 (assuming that such a match is allowed and that the degree of similarity (DS) between their representations is sufficiently high).

If a rule states that a match between client device 1 and client device 3 is more likely than a match between client device 1 and client device 2, then the degrees of similarity (DS) and the likelihoods of the matches (LM) will be weighed. In principle, various weighing schemes could be used, applying various weights as are suitable in particular cases. By way of example only, the following procedure could be used:
1. Compare each degree of similarity (DS) with a threshold (TH); if the degree of similarity is lower than the first threshold, the corresponding preliminary match is rejected.
2. Weigh the degrees of similarity (DS) of the remaining preliminary matches with the likelihoods (LM) of their occurrence and choose the largest one.

Step 1 could be written as: if DS<TH then reject.
Step 2 could be written as: select MAX(($DS_1*LM_1$), ($DS_2*LM_2$)).

If step 2 yields two equal (or nearly equal) numbers, then two matches could be made or both potential matches could be rejected, but preferably the match having the greatest degree of similarity (DS) is selected.

After the match is made (that is, one of the pairs of client devices is selected), this match is communicated to the application server 6 in a match message MH. This match message MH contains the identifications of the selected client devices and may further contain additional information, such as application information provided in the request messages RQ1, RQ2, ... :

MH={CI1,CI2, ... }.

The application server 6 may be selected from a plurality of application servers on the basis of the identifier (ID in FIG. 1). The correlation server 5 not only sends a match message to the application server, but also confirmation and rejection messages to the client devices. In case the match is made between the first client device 1 and the second device 2, the third client device 3 receives a rejection or "no match"

(NM) message, while the first and second client devices receive acknowledgement messages AC1 and AC2 respectively. The acknowledgement messages preferably contain an identification the other (that is, matched) device so as to allow the devices to mutually identify each other:

AC1={CI2},AC2={CI1}.

After mutually identifying each other, the devices 1 and 2 will establish contact in order to enter into a transaction, start a game, or carry out another activity involving both devices. To enter into contact, one of the devices has to send a message (contacting mode) while the other device has to wait for the message to arrive (waiting mode): there has to be an asymmetry in the states of the devices. However, the method of FIG. 3 leaves the devices in a symmetric situation: both have received an acknowledgement and are ready to contact the other device. To avoid a clash of contacting messages, a further aspect of the present invention removes this symmetric situation and assigns the initiative to one of the devices while instructing the other device to wait for a contacting message. To this end, the application logic of the application server (or, alternatively, the correlation server) may insert a start instruction (SI) or a wait instruction (WI) in the acknowledgement messages, sending only a single start instruction and sending a wait instruction to the other device(s). Accordingly, the acknowledgement messages may, in a preferred embodiment, be represented as:

AC1={CI2,SI, . . . },AC2={CI1,WI, . . . }.

In the arrangement of FIG. 3, the application server 6 is shown as a separate server, distinct from the correlation server 5, as described in European Patent Application 09160930 (TNO) filed 22 May 2009 and in corresponding International Patent Application PCT/NL2010/050313, the entire contents of both of which are herewith incorporated in this document. Providing a separate application server is, however, not essential, and the application server and the correlation server may be constituted by the same server. On the other hand, more than one correlation server and more than one application server may be used. In addition, proxy servers may be used, as described in European Patent Application 09160934 (TNO) filed 22 May 2009 and in corresponding International Patent Application PCT/NL2010/050310, the entire contents of both of which are herewith also incorporated in this document.

In FIG. 3, it is assumed that the application server 6 is provided with a predetermined set of matching rules. In some embodiments, however, it is desired that the rules can be adapted and/or can be made on the basis of successful matches. For this reason, an expert system may be provided for learning and providing rules. An arrangement comprising an expert system is schematically illustrated in FIG. 4, while the exchange of messages in such an arrangement is schematically represented in FIG. 5.

Figure 4:
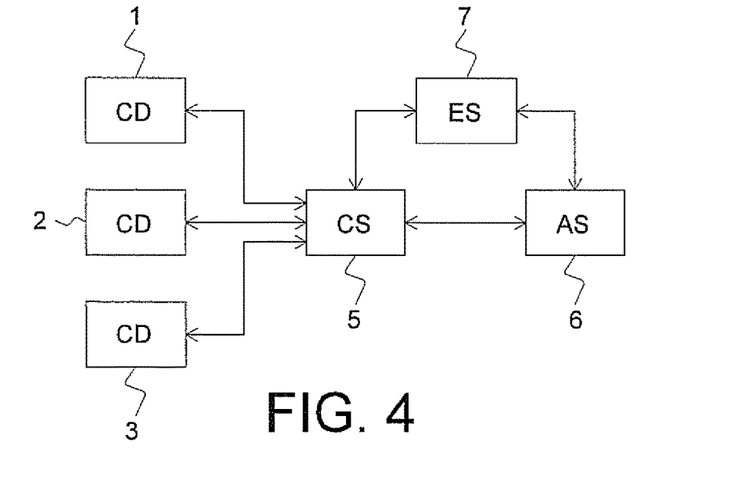
FIG. 4 schematically shows an exemplary embodiment of a system for identifying devices according to the present invention.

The arrangement of FIG. 4 comprises a first client device (CD) 1, a second client device 2 and a third client device 3, which are capable of communicating with a correlation server (CS) 5. As before, the communication between the client devices and the correlation server preferably, but not necessarily, is wireless. The correlation server 5 is coupled with an application server 6. In this embodiment, an expert system (ES) server 7 is coupled to both the correlation server 5 and the application server 6. This allows the expert system to obtain information from the correlation server and the application server, and to provide rules to the correlation server.

As illustrated in FIG. 5, the client devices send request messages to the correlation server, as in FIG. 3. In the embodiment of FIG. 5, however, the correlation server 5 sends the query message QY to the expert system server 7 instead of the application server 6. In response, the expert system server 7 sends a response message RS to the correlation server 5. The query message QY and the response message RS of FIG. 5 can, in principle, be equal or at least similar to their counterparts in FIG. 3. The rules provided by the expert system server 7 may also be cached, in a step cache response (CR). As in FIG. 3, a match is made, using the heuristics H constituted by the rules provided by the expert system server, and the correlation server 5 sends a match message MH to the application server 6. The application logic (AL) of the application server 6 then sends acknowledgement messages AC1 and AC2 to the matched client devices and a "no match" message NM to the client device that has not been matched. The application server 6 also sends a match information message MI to the expert system server 7 in order to provide feedback on the match that has been made. The match information contained in this match information message is used in a self-learning (SL) step, in which the rules may be adjusted if necessary. The expert system ES may, for example, keep track of all the matches that client device 1 has made with other client devices and use the collected statistics to determine the likelihood of client device 1 matching with a specific other client device. Alternatively, or additionally, the expert system ES may learn and recognise matching patterns. In mobile payment applications, for example, there may be matches between two mobile terminals, and between a mobile and a fixed (that is, stationary) terminal, but a match between two fixed terminals is very unlikely. If the expert system ES is not provided with this information in advance, it may deduce this information by analysing a number of matches.

It can be seen that in accordance with the present invention, identifying proximate devices involves matching sensory identifiers while taking other features, including matching rules, into account. It will be understood that the present invention is not limited to identifying proximate mobile devices but may also be used for matching devices in general on the basis of accumulated data and rules pertaining to those devices.

The matching and identification steps of the present invention, including the use of heuristics (rules), are carried out by the matching unit and preferably involve suitable software programs for carrying out the matching, identification, rule application and/or rule learning (expert system) steps. Software program products according to the present invention are designed for implementing these steps.

The present invention is based upon the insight that a set of rules describing the possibility and/or probability of certain matches facilitates the matching process and reduces the number of erroneous matches.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of identifying proximate devices, the method comprising the steps of:
   providing a sensory identifier capable of being detected by human senses,
   detecting, by a first device, the sensory identifier and sending a first request message to a matching unit, the first request message comprising a first representation of the sensory identifier and at least one of a first property of the first device indicating whether a predetermined game is loaded onto the first device or a pointer to the first property,
   detecting, by a second device, the sensory identifier and sending a second request message to the matching unit, the second request message comprising a second representation of the sensory identifier and at least one of a second property of the second device indicating whether the predetermined game is loaded onto the second device or a pointer to the second property,
   the matching unit comparing the first representation and the second representation and sending an acknowledgement message to each the first device and the second device if a match is made, the matching unit applying matching rules to limit the number of possible matches if the comparing results in making a match, the matching unit applying the matching rules to the first property and the second property comprised in or pointed at in the first request message and the second request message,
   the first device and the second device being configured to establish contact and start the game after identifying each other based on an acknowledgment message received from the matching unit.

2. A computer program product stored on a non-transitory computer-readable storage medium for carrying out the method according to claim 1.

3. A matching unit for matching proximate devices, wherein each of the proximate devices has detected a sensory identifier capable of being detected by human senses and has sent a respective request message to the matching unit, the request message comprising a respective representation of the sensory identifier detected by the each of the proximate devices and at least one of a property of the each of the proximate devices or a pointer to the property, the matching unit being arranged for:
   comparing the first representation and the second representation from the request messages of a first device and a second device of the devices and
   sending an acknowledgement message to each of the first device and the second device if a match is made, and
   applying matching rules relating to the properties of the respective proximate devices comprised in or pointed to in the request messages to limit the number of possible matches if the comparing results in making a match,
   the first device and the second device being configured to establish contact and start the game after identifying each other based on an acknowledgment message received from the matching unit.

4. The matching unit according to claim 3, wherein the pointer to the property is constituted by the property itself and/or is constituted by a device identification which allows the matching unit to retrieve the respective property.

5. The matching unit according to claim 3, further provided with an expert system for adjusting the rules in dependence on matches made.

* * * * *